US010013243B2

(12) United States Patent
Abadi et al.

(10) Patent No.: US 10,013,243 B2
(45) Date of Patent: *Jul. 3, 2018

(54) SYSTEM AND/OR METHOD FOR COMPUTING INTERPROCEDURAL DOMINATORS

(71) Applicant: International Business Machines Corporation, Armonk, NY (US)

(72) Inventors: Aharon Abadi, Eilat (IL); Moria Abadi, Eilat (IL); Jonathan Bnayahu, Haifa (IL); Yishai Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,177

(22) Filed: May 3, 2017

(65) Prior Publication Data

US 2017/0235667 A1    Aug. 17, 2017

Related U.S. Application Data

(63) Continuation of application No. 14/859,365, filed on Sep. 21, 2015, now Pat. No. 9,710,244, which is a
(Continued)

(51) Int. Cl.
*G06F 9/45* (2006.01)
*G06F 9/44* (2018.01)
(Continued)

(52) U.S. Cl.
CPC ............... *G06F 8/433* (2013.01); *G06F 8/40* (2013.01); *G06F 8/75* (2013.01); *G06F 11/3624* (2013.01); *G06F 11/3628* (2013.01); *G06F 8/73* (2013.01)

(58) Field of Classification Search
CPC ...... G06F 8/40–8/54; G06F 8/73; G06F 8/75; G06F 11/3624; G06F 11/3628
(Continued)

(56) References Cited

U.S. PATENT DOCUMENTS 6,098,074 A  *  8/2000  Cannon ............. G06F 17/30067
6,817,013 B2 * 11/2004  Tabata ..................... G06F 8/443
                                                                712/233
(Continued)

FOREIGN PATENT DOCUMENTS

WO    WO 2010060243 A1 *  6/2010  ............. G06F 8/456

OTHER PUBLICATIONS

Agrawal, H., "Efficient Coverage Testing Using Global Dominator Graphs," Proceedings of the 1999 ACM SIGPLAN-SIGSOFT Workshop on Program Analysis for Software Tools and Engineering [online], 1999 [retrieved Oct. 2, 2016], Retrieved from Internet: <URL:http://dl.acm.org/citation.cfm?id=316166>, pp. 11-20.*
(Continued)

*Primary Examiner* — Todd Aguilera

(57) ABSTRACT

According to an aspect of some embodiments of the present invention there is provided a computerized method of analyzing code of a software program for dominance relationships between a plurality of functions of the software program, the method comprising: receiving source code of a software program, the source code having a plurality of functions; identifying a plurality of intraprocedural dominator graphs each for another of the plurality of functions; combining the plurality of intraprocedural dominator graphs to create an interprocedural dominance graph with edges that logically connect between nodes of the plurality of functions; identifying a plurality of interprocedural dominance relations between nodes in different functions of the plurality of functions using the interprocedural dominance
(Continued)

graph; and analyzing the software program according to the plurality of interprocedural dominance relations.

17 Claims, 10 Drawing Sheets

Related U.S. Application Data continuation of application No. 13/955,017, filed on Jul. 31, 2013, now Pat. No. 9,195,458.

(51) Int. Cl.
  *G06F 11/36* (2006.01)
  *G06F 8/41* (2018.01)
  *G06F 8/40* (2018.01)
  *G06F 8/75* (2018.01)
  *G06F 8/73* (2018.01)

(58) Field of Classification Search
  USPC .................................. 717/123–126, 136–161
  See application file for complete search history.

(56) References Cited

U.S. PATENT DOCUMENTS

| | | | |
|---|---|---|---|
| 8,196,122 B2 | 6/2012 | McCrady et al. | |
| 8,689,192 B2* | 4/2014 | Dargelas | G06F 17/2854 704/10 |
| 9,710,244 B2* | 7/2017 | Abadi | G06F 8/433 |
| 2002/0095666 A1* | 7/2002 | Tabata | G06F 8/443 717/149 |
| 2008/0028380 A1* | 1/2008 | Guo | G06F 8/433 717/151 |
| 2010/0304158 A1 | 12/2010 | Madani et al. | |
| 2012/0159458 A1 | 6/2012 | Levanoni et al. | |

OTHER PUBLICATIONS

Tok, T., Removing Unimportant Computations in Interprocedural Program Analysis, The Univeristy of Texas at Austin [online], 2007 [retrieved Oct. 2, 2016], Retrieved from Internet: <URL: http://www.library.utexas.edu/etd/d/2007/tokt11153/tokt11153.pdf>, Chapter 3, pp. 33-52.*

Lösch, F., Instrumentation of Java Program Code for Control Flow Analysis, Universität Stuttgart [online], 2005 [retrieved Jul. 23, 2017], Retrieved from Internet: <URL: http://d-nb.info/104656403X/34>, pp. 11-12.*

De Sutter et al., "A Practical Interprocedural Dominance Algorithm", ACM Transactions on Programming Languages and Systems (TOPLAS), vol. 29 Issue 4, Aug. 2007, Article No. 19.

Georgiadis Loukas, "Finding Dominators In Intraprocedural Flow graphs", University of Ioannina, 2012. Can be found at : http://theory.di.uoa.gr/acac12/content/presentations/Georgiadis_interdom-acac2012.pdf.

Cooper et al., "A Simple, Fast Dominance Algorithm", Department of Computer Science, Rice University, Houston, Texas, USA.

Sreedhar et al., "Incremental Computation Of Dominator Trees", IR 95' Papers from the 1995 ACM SIGPLAN workshop on Intermediate representation, pp. 1-12.

* cited by examiner

```
1    void main(String[ ] args) {
2      f1(..., ..., ...);
3    }
4
5    void f1(boolean a, boolean b, boolean c) {
6      if (a)
7         f1(..., ..., ...);
8      else
9         if (b) f2(c); else f3( );
10     f4( );
11   }
12
13   void f2(boolean c) {
14     if (c)
15        f1(..., ..., ...);
16     else f3 ( );
17   }
18
19   void f3( ) { }
20
21   void f4( ) { }
```

FIG. 3A

| Program | Methods | Basic blocks | IDC nodes | 1 Thread | 1 CPU | 2 CPUS | 4 CPUS | 8 CPUS |
|---|---|---|---|---|---|---|---|---|
| RemoteSearchable | 141 | 7,994 | 3,535 | 78 | 170 | 145 | 61 | 55 |
| PorterStemmer | 18 | 8,671 | 773 | 247 | 656 | 318 | 209 | 76 |
| IndexReader | 41 | 9,872 | 1,250 | 264 | 224 | 280 | 156 | 23 |
| hsqldb | 3,902 | 103,830 | 92,806 | 169,802 | 4,612 | 3,521 | 2,966 | 1,270 |
| derby | 77 | 105,810 | 2,097 | 3,761 | 1,415 | 1,101 | 347 | 86 |
| dump | 202 | 109,817 | 4,048 | 524 | 426 | 227 | 83 | 27 |
| decorate | 470 | 122,079 | 13,536 | --- | 1448 | 1029 | 821 | 582 |
| cassandra | 2,624 | 175,888 | 52,878 | --- | 3,524 | 2,246 | 1,445 | 933 |
| optimize | 2,141 | 230,799 | 71,223 | --- | 227,993 | 160,137 | 130,281 | 89,915 |

FIG. 5A

| Program | 1 CPU | | 2 CPUS | | 4 CPUS | | 8 CPUS | |
|---|---|---|---|---|---|---|---|---|
| | Min | Max | Min | Max | Min | Max | Min | Max |
| decorate | 914 | 2,399 | 613 | 1,684 | 633 | 1,260 | 567 | 608 |
| cassandra | 3,107 | 4,367 | 1,024 | 3,602 | 964 | 2,524 | 907 | 967 |
| optimize | 197,001 | 252,174 | 145,607 | 174,300 | 122,587 | 141,138 | 81,974 | 96,820 |

FIG. 5B

SYSTEM AND/OR METHOD FOR COMPUTING INTERPROCEDURAL DOMINATORS

CROSS REFERENCE TO RELATED APPLICATIONS

This application is a continuation of U.S. patent application Ser. No. 14/859,365 filed on Sep. 21, 2015, which is a continuation of U.S. patent application Ser. No. 13/955,017 filed on Jul. 31, 2013, now U.S. Pat. No. 9,195,458.

The contents of the above applications are all incorporated by reference as if fully set forth herein in their entirety.

BACKGROUND

The present invention, in some embodiments thereof, relates to a method and/or a system for computing dominators and, more specifically, but not exclusively, to a method and/or a system for computing interprocedural dominators.

Cooper, Keith D., Timothy J. Harvey, and Ken Kennedy. "A simple, fast dominance algorithm." *Software Practice & Experience* 4 (2001): 1-10, appears to disclose "The problem of finding the dominators in a control-flow graph has a long history in the literature. The original algorithms suffered from a large asymptotic complexity but were easy to understand. Subsequent work improved the time bound, but generally sacrificed both simplicity and ease of implementation. This paper returns to a simple formulation of dominance as a global data-flow problem."

In a presentation, entitled "Finding Dominators in Interprocedural Flowgraphs", Loukas Georgiadis of the University of Ioannina appears to present an algorithm for finding dominators in interprocedural flowgraphs. Georgiadis appears to compute the interprocedural dominator relation based on solving dataflow equations and/or based on interprocedural depth first search.

SUMMARY

According to an aspect of some embodiments of the present invention there is provided a computerized method of analyzing code of a software program for dominance relationships between a plurality of functions of the software program, the method comprising: receiving source code of a software program, the source code having a plurality of functions; identifying a plurality of intraprocedural dominator graphs each for another of the plurality of functions; combining the plurality of intraprocedural dominator graphs to create an interprocedural dominance graph with edges that logically connect between nodes of the plurality of functions; identifying a plurality of interprocedural dominance relations between nodes in different functions of the plurality of functions using the interprocedural dominance graph; and analyzing the software program according to the plurality of interprocedural dominance relations.

According to some embodiments of the invention, the computerized method further comprises: identifying one or more interprocedural dominance candidates in the intraprocedural dominator graph; computing an interprocedural dominator set for each of the interprocedural dominance candidates; and wherein combining comprises computing the interprocedural dominance graph by logically adding interprocedural edges between the one or more interprocedural dominance candidates and one or more dominators from the interprocedural dominator set.

Optionally, computing the interprocedural dominator set comprises computing the interprocedural dominator set for one of the interprocedural dominance candidates on demand.

Optionally, the computerized method further comprises: identifying an interprocedural control flow graph of the plurality of functions; and wherein the interprocedural dominance candidate comprises a node that is a function entry with more than one predecessor in the interprocedural control flow graph, and the node is in the dominance frontier of a resume node or the node is in the dominance frontier of another interprocedural dominance candidate.

Optionally, the method further comprises adding a set of blocking nodes to the interprocedural control flow graph so that the computing does not trace circular paths. According to some embodiments of the invention, combining comprises computing an interprocedural dominator set for each interprocedural dominance candidates in parallel.

According to some embodiments of the invention, the method further comprises making localized changes to one or more of the plurality of functions, re-computing an interprocedural dominator set only for the affected interprocedural dominance candidates of the one or more functions that were changed, and re-connecting only the affected nodes.

According to some embodiments of the invention, the interprocedural dominance graph represents correct domination relationships during intermediate periods of the combining the plurality of intraprocedural dominator graphs to create the interprocedural dominance graph.

According to some embodiments of the invention, the method further comprises caching data of a computed interprocedural dominator set so that the cached data is available for subsequent dominator calculations.

According to some embodiments of the invention, combining comprises creating the interprocedural dominance graph by adding an edge connecting a call node of a function with a single call site, to an entry node of the function.

According to some embodiments of the invention, combining comprises creating the interprocedural dominance graph by adding an edge connecting each function exit node to every resume node the function may return to.

According to some embodiments of the invention, the method further comprises removing extra edges from the interprocedural dominance graph, wherein the extra edges summarize interprocedural edges already existing in the interprocedural dominance graph.

According to some embodiments of the invention, one or more function calls of the plurality of functions are polymorphic.

According to some embodiments of the invention, the intraprocedural dominator graphs are intraprocedural dominator trees.

According to some embodiments of the invention, a computer readable medium comprises computer executable instructions adapted to perform the computerized method.

According to an aspect of some embodiments of the present invention there is provided a system for computing an interprocedural dominance graph from a plurality of associated functions, the system comprising: a first processor; and a first memory in electrical communication with the processor, the memory having stored thereon: a module for providing an interprocedural control flow graph of the plurality of associated functions; a module for receiving source code of a software program, the source code having a plurality of functions; a module for identifying a plurality of intraprocedural dominator graphs each for another of the plurality of functions; a module for combining the plurality of intraprocedural dominator graphs to create an interprocedural dominance graph logically connecting between nodes of the plurality of functions; a module for identifying a plurality of interprocedural dominance relations between nodes in different functions of the plurality of functions using the interprocedural dominance graph; and a module for analyzing the software program according to the plurality of interprocedural dominance relations.

According to some embodiments of the invention, the system further comprises a plurality of processors in electrical communication with the first processor, and the first memory comprises a module for computing an interprocedural dominator set for each interprocedural dominance candidate in parallel among the plurality of processors.

According to some embodiments of the invention, the system further comprises one or more input units adapted for allowing a user to input changes to one or more of the plurality of functions, and the first memory comprising a module for re-computing a interprocedural dominator set only for the affected interprocedural dominance candidates of the one or more functions that were changed.

According to some embodiments of the invention, the system further comprises a cache memory in electrical communication with at least one of the first processor and the first memory, the first memory further comprising a module for storing data of a computed interprocedural dominator set on the cache memory so that the cached data is available for subsequent dominator calculations.

According to an aspect of some embodiments of the present invention there is provided a computer program product for computing an interprocedural dominance graph from a plurality of associated functions, the computer program product comprising: one or more computer-readable storage mediums, and program instructions stored on at least one of the one or more storage mediums, the program instructions comprising: program instructions for receiving source code of a software program, the source code having a plurality of functions; program instructions for identifying a plurality of intraprocedural dominator graphs each for another of the plurality of functions; program instructions for combining the plurality of intraprocedural dominator graphs to create an interprocedural dominance graph logically connecting between nodes of the plurality of functions; program instructions for identifying a plurality of interprocedural dominance relations between nodes in different functions of the plurality of functions using the interprocedural dominance graph; and program instructions for analyzing the software program according to the plurality of interprocedural dominance relations.

According to some embodiments of the invention, the program product further comprises program instructions for computing an interprocedural dominator set for each interprocedural dominance candidate in parallel.

According to some embodiments of the invention, the program product further comprises program instructions for re-computing an interprocedural dominator set only for affected interprocedural dominance candidates of one or more of the plurality of functions that have been changed.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A is an example program used to explain embodiments of the invention;

FIGS. 5A-5B are tables of experimental results, useful for helping to understand exemplary embodiments of the invention.

DETAILED DESCRIPTION

Figure 1:
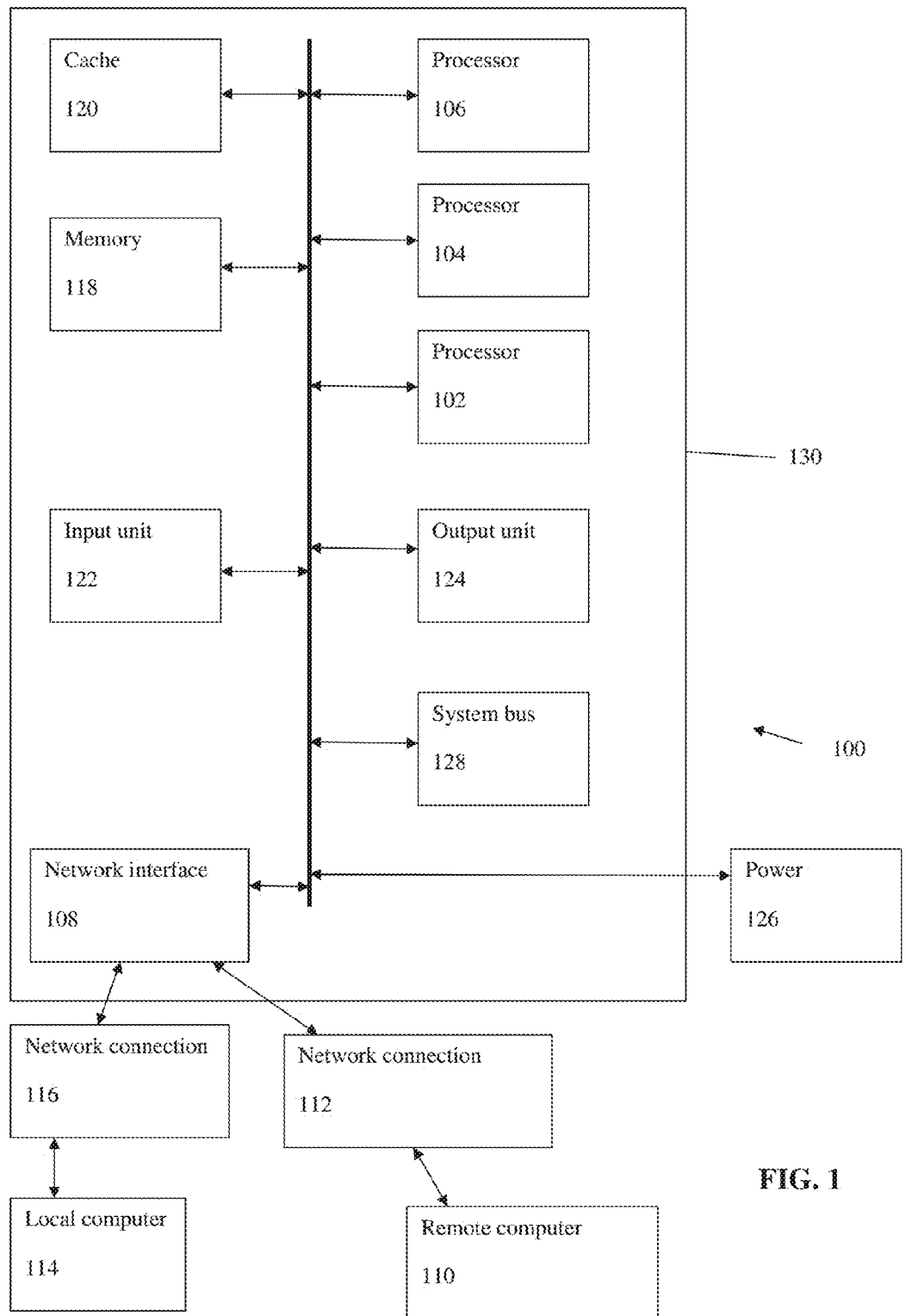
FIG. 1 is a block diagram of a computer system for computing interprocedural dominators, in accordance with exemplary embodiments of the invention.

An aspect of some embodiments of the invention relates to a computerized method and/or system and/or a computer program product for using intraprocedural dominator graphs for incremental and/or on-demand analysis of software programs comprising a plurality of functions. Advantageously, this process allows parallelism and/or scaling out. Advantageously, this process reduces the changes needed to move from intra-procedural to inter-procedural analysis.

In exemplary embodiments, a plurality of intraprocedural dominator graphs computed for a plurality of functions of software program code, are combined to form an interprocedural dominance graph. Optionally, the interprocedural dominance graph is analyzed to identify dominance relationships, for example, between functions of the software program. Optionally, the identified dominance relationships are used to analyze the software program.

In exemplary embodiments, the computer program code is analyzed to construct an interprocedural control-flow graph. Optionally, a plurality of intraprocedural dominator graphs are constructed for the different program functions. Optionally or additionally, the initial intraprocedural dominator graphs are combined into an initial interprocedural dominance graph. Optionally or additionally, interprocedural dominance candidates of the intraprocedural dominator graph are identified. Optionally or additionally, the dominator set of the interprocedural dominance candidates is calculated. Optionally or additionally, edges are added between an interprocedural dominance candidate and an immediate dominator. Optionally, or additionally, the edges are incrementally added.

Optionally, the edges are added without conducting a full program analysis. Advantageously, the interprocedural dominance graph may be computed relatively quicker, for example, when compared to methods that require analysis of the full program. Advantageously, large programs may be analyzed quickly, for example, programs with several hundreds of thousands of basic blocks.

Advantageously, the dominance relation (e.g., and its derivatives, for example, the control-dependence relation) are used, for example, in compiler optimization, applications such as program slicing, the computation of the static single assignment (SSA) form, and/or other computations related to control dependence.

In exemplary embodiments, the computation of the dominators of a node (e.g., each node) is independent of the computation of any other node. Optionally, the computation of the dominators is performed on demand, for example, as required.

Optionally, the computation of the dominators is performed for an affected node, for example, due to localized program changes, for example, by a human user programming changes. Optionally, the computation is performed without having to analyze other unaffected nodes, for example, without having to reanalyze the entire program.

Optionally, the computation of the dominators is performed in parallel, for example, using a plurality of processors in electrical communication with one another. Advantageously, performing the computation in parallel is relatively faster than performing the computations serially.

Optionally, the interprocedural dominance graph is built incrementally. Optionally, edges are added to an existing interprocedural dominance graph. Optionally, the adding of the edges occurs in any order. Advantageously, the interprocedural dominance graph represents correct relationships during stages of the incremental addition of edges.

Optionally, the interprocedural dominance candidates are identified from the existing intraprocedural dominator graphs and/or trees. Optionally, the interprocedural dominance candidates are the only nodes that can have interprocedural dominance edges. Optionally, the intraprocedural dominator tree is extended by deriving the interprocedural edges.

As used herein, the term "dominance" means, that in a single function, a node u in the function control-flow graph (CFG) is said to dominate another node v if every path from the entry of the function to v must first pass through u.

Optionally, the definition of dominance is extended to the interprocedural case. (e.g., the definition of dominance in the previous paragraph refers to the intraprocedural case). The interprocedural definition considers only paths that preserve the semantics of function calls, which cannot be nested improperly, for example, if a function $f$ calls (directly or indirectly) a function g, then $f$ cannot return before g has returned. Function calls and returns may therefore be paired on a valid interprocedural path so that they nest properly. In addition, any valid path from the initial node may have unmatched calls (for example, allowing for program termination by methods such as System.exit( )), but may not have unmatched returns.

As used herein, the phrase "balanced path" means a valid path that has no unmatched calls or returns. Interprocedural dominance is herein defined with respect to valid paths only. For example, in the example program of FIG. 3A, there is an invalid path in the corresponding control-flow path of FIG. 3B, that passes through the call to f1 in main (line 7) and returns to f2 after the call to f1 on line 15. If this path is considered in the dominance computation, it may prevent the discovery of correct relationships; for example, that the condition on line 6 dominates the entry of f2.

In the intraprocedural case, each node v in the control flow graph, except the first node, has a unique immediate dominator, which is a strict dominator of v and is dominated by every other strict dominator of v. As used herein, the phrase "strict dominator of v" means a dominator u≠v of v.

One example of a representation for the intraprocedural domination relation is a tree in which the parent of each node v is its immediate dominator. As used herein, the term "idom(v)" means immediate dominator. However, in the interprocedural case there may not be a unique immediate dominator. For example, in the program of FIG. 3A, the if (c) condition inside f2 (line 14) is an intraprocedural immediate dominator of the exit of f2. The exit of function f3 is also an immediate dominator of the exit of f2. Exiting f2 requires going through f3; if f2 does not call f3 directly, it calls f1, and it is exiting this call requires going through f3, either from the call in f2 or the one in f1. Therefore, in this example, neither of these dominates the other; it is possible to go through the condition without calling f3 at all, and it is possible to call f3 without calling f2. This example shows that the representation of the dominance relation in the interprocedural case may be a graph.

As used herein, the term "idom(v)" means the set of all nodes that strictly dominate v but do not strictly dominate any other strict dominator of v.

As used herein, the phrase "interprocedural dominance candidates" means: a node v is an interprocedural dominance candidate if: v is a function entry with more than one predecessor in the interprocedural control-flow graph, and v is in the dominance frontier of a resume node or v is in the dominance frontier of another interprocedural dominance candidate.

As used herein, the phrase "dominance frontier" means: The dominance frontier of a control-flow graph node x is the set of all control-flow graph nodes y such that x dominates a predecessor of y but does not strictly dominate y.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM, (an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™ SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a block diagram of a system 100 for computing the interprocedural dominance graph, in accordance with exemplary embodiments of the invention.

Optionally, system 100 comprises one or more computers and/or processors in electrical communication with one another, for example, arranged to compute at least some parts of the interprocedural graph in parallel. Optionally, system 100 comprises a first processor 102 for executing program instructions. Optionally, system 100 comprises or more additional processors, for example, a second processor 104 and/or a third processor 106.

Optionally, system 100 comprises one or more network interfaces 108 for providing electrical communication with external devices. Optionally, network interface 108 provides connectivity to one or more remote computers 110, for example, through a first network connection 112, for example, an internet connection. Alternatively or additionally, network interface 108 provides connectivity to one or more local computers 114, for example, through a second network connection 116, for example, a wire and/or wireless Ethernet connection. Optionally, processors 102, 104 and/or 106 are in electrical communication with remote computer 110 and/or with local computer 114, for example, being able to perform parallel computations and/or shared other stored data.

In exemplary embodiments, system 100 comprises a first memory 118 for storing program instructions, for example, read only memory, random access memory. Optionally, system 100 comprises one or more additional memory elements, for example, optionally cache memory 120. Optionally, cache memory 120 is adapted for storing computed data, for example, data computed by processor 102. Optionally, memory 118 and/or 120 is removable, for example, a CD-ROM, a USB key, or other types of 'plug-in' memory.

In exemplary embodiments, system 100 comprises one or more input units 122 for allowing a user to input data. For example, a keyboard, touchscreen and/or mouse.

In exemplary embodiments, system 100 comprises one or more output units 124 for allowing a user to view data. For example, a monitor and/or printer.

In exemplary embodiments, system 100 comprises one or more power sources 126, for example, a plug for a wall socket and/or batteries.

In exemplary embodiments, a system bus 128 provides electrical communication and/or connectivity to allow data exchange between one and more of: processor 102 104 106, network interface 108, memory 118 120, input unit 122 and/or output unit 124.

Optionally, system bus 128, network interface 108, processors 102, 104 and/or 106, memory 118 and/or 120, input unit 122 and/or output unit 124 are integrated into a computer 130, for example, a laptop or a desktop.

Figure 2:
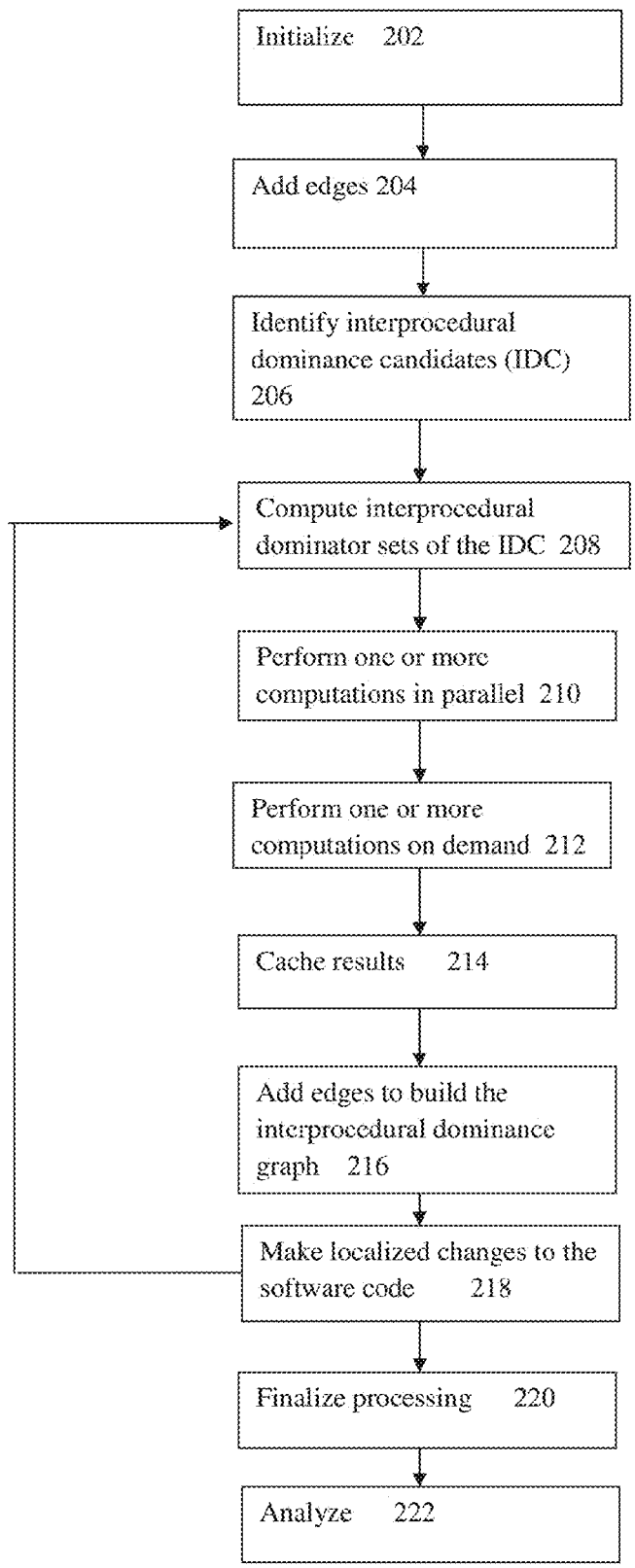
FIG. 2 is a flowchart of a computerized method of computing an interprocedural dominance graph, in accordance with exemplary embodiments of the invention.

FIG. 2 is a flow chart of a computerized method of calculating the interprocedural dominance graph, in accordance with exemplary embodiments of the invention. In exemplary embodiments, the interprocedural dominance graph represents the interprocedural dominance relation, for example, of program source code comprising a plurality of functions.

The computerized method may be performed, for example, by the computer system described with reference to FIG. 1.

In exemplary embodiments, the interprocedural dominance graph contains the intraprocedure dominator trees and/or graphs for the procedures in the program, for example, the interprocedural dominance graph is an extension of the intraprocedure dominator graphs. Optionally, the intraprocedure dominator graphs for the procedures are represented as subgraph.

In exemplary embodiments, a call node may not have an edge connection to the following resume node, if the resume node is not reachable from the call node, for example, when the called function never returns.

In exemplary embodiments, the interprocedural dominance graph is built incrementally. Optionally, the interprocedural dominance graph represents correct domination relationships, for example, during the computation.

Advantageously, the method may be carried out on large programs, in parallel and/or on demand (e.g., for changed nodes). Advantageously, the method may be relatively faster than other methods, for example, methods requiring analysis of the entire program. Advantageously, the full dominance relation is not necessarily computed if information is required for only a small set of nodes. Advantageously, only the affected nodes may be re-analyzed.

Advantageously, the method may be used in program analysis, for example;
  Compiler optimization: the interprocedural dominance graph may be used to understand how one function and/or node dominates other functions and/or nodes. Redundancies may be identified and/or removed. For example, as described by S. S. Muchnick. *Advanced Compiler Design and Implementation*. Morgan Kaufmann, 1997.
  Program testing: using dominance relationships represented by the interprocedural dominance graph, test cases that may reduce repetition and/or provide more effective coverage may be planned. For example, as described with reference to H. Agrawal. Efficient coverage testing using global dominator graphs. In *Proc. Workshop on Program Analysis for Software Tools and Engineering*, PASTE '99, pages 11-20, 1999.
  Program optimization: using the interprocedural dominance graph, dead code and/or unreachable code may be identified and/or removed. For example, as described with reference to S. Calman and J. Zhu. Increasing the scope and resolution of interprocedural static single assignment. In *Proc. 16th Int'l Symp. Static Analysis*, SAS '09, pages 154-170, 2009.
  Program slicing: using the interprocedural dominance graph, self contained parts of the program may be identified and analyzed independently of the larger program. For example, as described with reference to S. Horwitz, T. Reps, and D. Binkley. Interprocedural slicing using dependence graphs. *ACM Trans. Program. Lang. Syst.*, 12(1):26-60, 1990. And/or as described with reference to M. Sharir and A. Pnueli. Two approaches to interprocedural data flow analysis. In S. S. Muchnick and N. D. Jones, editors, *Program Flow Analysis: Theory and Applications*, pages 189-233. Prentice Hall, 1981.

Optionally, at 202, one or more initializations are performed.

Optionally, source code of a software program is received, the source code having a plurality of functions. For example, the software program is manually coded by a programmer, the source code is downloaded from the internet, and/or the source code is stored on a memory on a computer.

In exemplary embodiments, a plurality of intraprocedural dominator graphs is identified. Alternatively or additionally, a plurality of intraprocedural dominator trees is provided. Optionally, one of intraprocedural dominator graphs is a representation of one function of the plurality of functions. For example, a graph is provided for each function, for example, the plurality of functions comprising a program.

Optionally, the intraprocedural dominator trees and/or graphs are calculated, for example, by a suitable algorithm, for example, an algorithm described by Lengauer and Tarjan (T. Lengauer and R. E. Tarjan. A fast algorithm for finding dominators in a flowgraph. *ACM Trans. Program. Lang. Syst.*, 1(1):121-141, July 1979.), hereby incorporated by reference in its entirety.

In exemplary embodiments, an interprocedural control flow graph is provided, for example, as described in the call-string approach of Sharir and Pnueli (M. Sharir and A. Pnueli. Two approaches to interprocedural data flow analysis. In S. S. Muchnick and N. D. Jones, editors, *Program Flow Analysis: Theory and Applications*, pages 189-233. Prentice Hall, 1981.) and/or that of De Sutter et al (B. De Sutter, L. Van Put, and K. De Bosschere. A practical interprocedural dominance algorithm. *ACM Trans. Program. Lang. Syst.*, 29(4), August 2007), herein incorporated in their entirety by reference.

With reference to FIG. 1, the intraprocedural dominator graphs and/or the interprocedural control-flow graph are provided, for example, by being stored on memory 118, being inputted by a user through input unit 122, computed (e.g., from source code of a program) by processor 102, and/or downloaded from the internet from remote computer 110.

In exemplary embodiments, the interprocedural dominance graph is built incrementally from the intraprocedural dominator trees, for example, as described herein.

In exemplary embodiments, the interprocedural control-flow graph comprises the standard control-flow graphs of each procedure, for example, the intraprocedural control-flow graphs. Optionally, each procedure has a unique entry node and/or a unique exit node. Optionally, each call site is represented by two nodes, a call node and a resume node. Optionally, the call node is connected by a call edge to the entry of the called procedure, and/or the resume node has an incoming return edge from the exit of the called procedure. Optionally, the call edge of each call site is connected by an intraprocedural edge to the resume node of the same site.

Optionally, entry nodes have multiple incoming call edges. Optionally, exit nodes have multiple outgoing return edges.

Optionally, there is a unique main procedure, which is the entry point to the whole program.

Optionally, each call node is associated with a single, known, function. Alternatively, each call node is associated with polymorphic methods and/or function pointers.

Optionally, the call-to-resume edges where the resume node is unreachable from the call node are removed, for example, using context-sensitive depth first search (DFS), for example, as described De Sutter et al. (B. De Sutter, L. Van Put, and K. De Bosschere. A practical interprocedural dominance algorithm. *ACM Trans. Program. Lang. Syst.,* 29(4), August 2007), hereby incorporated by reference in its entirety.

In exemplary embodiments, the initial interprocedural dominance graph comprises of the intraprocedural dominator trees without unreachable call-to-resume edges. Optionally, unreachable nodes are identified, for example, in a pre-processing step.

At 204, one or more interprocedural dominance edges are added to the intraprocedural dominator graphs. In exemplary embodiments, the interprocedural edges link together the plurality of intraprocedural dominator graphs. In exemplary embodiments, an initial form of the interprocedural dominance graph is formed by the addition of the edges.

In exemplary embodiments, the plurality of intraprocedural dominator graphs are combined to create an initial interprocedural dominance graph. Optionally, the interprocedural dominance graph logically connects between nodes of the plurality of functions, for example, edges in the graph provide the logical connections.

Optionally, edges that only require local analysis (e.g., of the interprocedural control-flow graph) are added.

Optionally, the interprocedural dominance edges are added for functions having a single call site. For example, if a function is associated with the single call site, that site dominates the function entry. Alternatively or additionally, the interprocedural dominance edges are added for all returns. For example, every function exit node dominates all the resume nodes it may return to.

Optionally, the edges are added by copying edges from the interprocedural control-flow graph to the interprocedural dominance graph.

Optionally, a set of blocking nodes is associated with the interprocedural dominance graph. Alternatively or additionally, a set of blocking nodes is associated with the interprocedural control-flow graph. Optionally, the blocking nodes prevent following circular paths in the interprocedural control-flow graph.

At 206, interprocedural dominance candidates are identified.

In exemplary embodiments, all dominators are traced to identify the interprocedural dominance candidates, for which new interprocedural dominators may be discovered. Optionally, previously discovered immediate dominators are followed. Optionally, when an interprocedural dominance candidate is reached during the following, predecessors of the interprocedural dominance candidate in the control flow graph are followed. Optionally, the following finds dominators that have not yet been discovered.

Optionally, dominance frontiers are computed. Advantageously, once the dominance frontiers have been computed, the set of all interprocedural dominance candidates may be computed in a linear-time algorithm.

Optionally, a set of blocking nodes is associated with each search. Advantageously, the blocking nodes may prevent following circular paths.

At 208, the dominator set of each interprocedural dominance candidate is computed, for example, by using Algorithm 2 as described below.

Optionally, the computations of the dominator sets are calculated by iterations over all interprocedural dominance candidates.

Optionally, one or more edges are derived. Optionally, the derived edges require global analysis.

Optionally, the computations of one dominator set are performed independently of computations of other dominator sets.

Optionally, at 210, one or more computations of the dominator set of the interprocedural dominance candidates are performed in parallel. Alternatively or additionally, the computations of the dominator sets are performed in any order.

The computations may be performed in parallel, for example, by distribution to local processors within the computer (e.g., processors 102, 104 and/or 106 of FIG. 1), by distribution to other local computers (e.g., local computer 114 of FIG. 1) and/or by distribution to remote computers (e.g., remote computer 110 of FIG. 1).

Advantageously, the more parallel threads that are available, the faster the overall calculation may be performed.

Optionally, at 212, the dominators of a node are computed on demand. Optionally, the dominators for an interprocedural dominance candidate are calculated for any node on demand. Optionally, the calculations are performed recursively, for example, by recursive function calls.

Optionally, at 214, at least some data from the computation of the interprocedural dominance graph is cached. For example, computational results are stored on cache memory 120 of FIG. 1. Optionally, the saved computations are used to reduce or prevent repetitive computations.

Optionally, the results or partial results of computing dominators for the interprocedural dominance candidate are saved on the cache memory. Optionally, the saved computed dominators are used to reduce or prevent repetition in subsequence computations, for example, in computations that would re-compute the dominators for the same interprocedural dominance candidate. Alternative or additionally, the results of partial results of computed interprocedural dominance graph edges for the interprocedural dominance candidate are saved.

Optionally, results of one computation (e.g., dominator sets as in 208) are saved on the cache, for example, ready to be used in cases where the same full or partial computation would have been repeated. Optionally, the cached computations are used in another calculation, for example, when the calculations of dominators of interprocedural dominance candidates are performed independently of one another, results may be shared instead of being recomputed. Optionally, the computations for different interprocedural dominance candidates are intertwined by using the saved data.

Optionally, blockers are cached, for example, as described below with reference to Algorithm 2.

Advantageously, saving the results of one computation to use in another computation prevents or reduces other and/or future dominance computations. Advantageously, the results of the same computation are already available and do not have to be recomputed.

At 216, one or more edges are added to the interprocedural dominance graph. Optionally, the derived edges (e.g., derived in method 208) are added. Optionally, the edges are added incrementally to the interprocedural dominance graph. Advantageously, the interprocedural dominance graph represents correct dominance representations at each stage of the incremental addition of the edges.

Optionally, the derived edges are added to the interprocedural dominance candidates. Optionally, the immediate-dominator sets of the interprocedural dominance candidates are extended. Optionally, the computations of adding the derived edges are performed for every node in the graph.

Optionally, at 218, one or more localized changes are made to one or more functions of the program being analyzed. For example, source codes lines are changed, deleted and/or added, for example, by a programmer fixing a bug in a program and/or by a programmer adding additional features to the program. The changes are made, for example, by a user manually changing lines of program source code, for example, typing the changes using a keyboard (e.g., input unit 122 of FIG. 1). The changes may also be made, for example, automatically by another program.

Optionally, after the localized changes are made, the interprocedural dominator set of the interprocedural dominance candidates of the affected functions are recomputed, for example, by referring back to box 208. Optionally, only affected dominance candidates are re-analyzed, so that analysis of the full program and/or analysis of unaffected functions is not required.

Optionally, at 220, one or more additional computations are performed. For example, final processing of the interprocedural dominance graph. Alternatively, the interprocedural dominance graph is complete.

Optionally, the graph consisting of all edges (u; v) where u 2 idom(v) is a directed acyclic graph (DAG). Optionally, the graph has the same property of the intraprocedural dominator tree, for example, paths in the graph represent the full dominance relation. Optionally, the method described herein computes the interprocedural dominance graph, which may be an over-approximation to this graph. Optionally, the graph preserves the same property, but may have some additional edges that summarize some interprocedural edges already in the graph. Optionally, these extra edges are removed, for example, by additional processing.

As used herein, the phrase "summary path" means: for every valid path p, the summary path of p is defined to be the path p' derived from p by replacing every balanced path from a call to the corresponding return with a single call-to-resume edge. On the summary path, any edge from a call node to a function entry, and/or from a function exit to a resume node, is unmatched on the path.

Optionally, added nodes are removed, for example, nodes added to handle polymorphism, for example, as described below.

One or more computations as described by boxes 202, 204, 206, 208, 210, 212, 214, 216, 218, and/or 220 are performed, for example, by one or more software modules, for example, stored on a memory (e.g., memory 118 of FIG. 1).

Optionally, at 222, the software program is analyzed. Optionally, the analysis is performed according to a plurality of interprocedural dominance relations. The analysis is performed, for example, automatically by software, manually by a human viewing a graphical representation of the dominance relations on a screen, and/or by a combination of both software and human.

Optionally, the plurality of interprocedural dominance relations are identified between nodes in different functions of the plurality of functions using the interprocedural dominance graph.

Optionally, the plurality of interprocedural dominance relations are used in further program analysis, for example, compiler optimization, program testing, program optimization, program slicing and/or other applications, for example, as described herein.

Optionally, the method and/or system is extended to support polymorphism. Alternatively or additionally, each call site uniquely identifies the called function.

Optionally, each polymorphic call in the interprocedural control-flow graph is represented as a series of tests on the dynamic type of the target, for example, using all possible implementing classes as determined, for example, by the best approximation available (and/or all implementing subclasses of the static type in the worst case).

Optionally, the new nodes added for the representation do not appear in the original interprocedural control-flow graph. Optionally, the added nodes are removed by a later post-processing step, for example, box 220 of FIG. 2.

Optionally, the method is used to handle function pointers in languages that offer them.

Advantageously, extending the method and/or system to accommodate polymorphism is used, for example, for object-oriented languages, in which the code executed for a specific method call depends on the type of the target of the invocation. Without having any other information, every subclass of the static type of the target that implements the method can potentially be called. However, using static analysis (including pointer analysis) it is possible in many cases to narrow the possible implementations that can be called.

Algorithm 1, as shown below, is an exemplary example of a mathematical representation of the method described with reference to FIG. 2, in accordance with exemplary embodiments of the invention. Optionally, Algorithm 1 builds the interprocedural dominance graph incrementally from the intraprocedural dominator trees. Algorithm 1 is exemplary and is not necessarily limiting, for example, as other implementation of the method are also possible.

The input to Algorithm 1 is an interprocedural control-flow graph on a set V of nodes. The output produced by Algorithm 1 is the corresponding interprocedural dominance graph.

---

Algorithm 1:

1. [Add intraprocedural edges] Compute the intraprocedural dominator graphs and/or trees; (e.g., using context-sensitive DFS remove all call-to-resume edges where the resume node is unreachable from the call node); combine the graphs and/or trees to form the initial interprocedural dominance graph.

2. [Add call edges] For every function that has a single call site, add to the interprocedural dominance graph an edge connecting the call node to the function entry node.

3. [Add return edges] Add to the interprocedural dominance graph edges connecting each function exit node to every resume node it can return to.

4. [Add derived edges] For every interprocedural dominance candidate (IDC) v ∈IDC:
   (a) Let S = dominators(v, ∅) \ {v}.
   (b) Set idom(v) to be the set of all elements u ∈S such that u does not have an interprocedural dominance graph successor u' ∈S.
   (c) Add to the interprocedural dominance graph an edge (u, v) for each u ∈ idom(v).

---

Algorithm 2, as shown below, in an exemplary algorithm to perform the dominators function used in step 4a of Algorithm 1, in accordance with exemplary embodiments of the invention. Optionally, Algorithm 2 computes the dominator set for a node v given a blocker set B. Optionally, Algorithm 2 computes a partial domination relationship, relative to a set B of blocker nodes. Algorithm 2 is exemplary and is not necessarily limiting, for example, as other implementation of the method are also possible.

Algorithm 2 computes interprocedural dominators for input v, which is optionally an interprocedural dominance candidate. Algorithm 2 follows existing dominance edges in the interprocedural dominance graph. When Algorithm 2 reaches one of the interprocedural dominance candidates, the algorithm computes the intersection of the dominators of its predecessors in the interprocedural control-flow graph. This computation ignores cycles in the interprocedural control-flow graph, by optionally using a blocking set B of nodes that have already been visited during this search.

---
Algorithm 2:
---
dominators(v,B):
1:  If v ∈IDC then
2:      R ← V
3:      Let B'= B ∪{v}
4:      for every interprocedural control-flow graph predecessor r of v such that there is no path in the interprocedural dominance graph from an element of B' to r
        do
5:          Let S = dominators(r,B')
6:          R ← R ∩ S
7:      end for
8:      return R ∪{v}
9:  else
10:     P ← {v}
11:     for every interprocedural dominance graph predecessor d of v do
12:         P ← P ∪dominators(d,B)
13:     end for
14:     return P
15: end if

---

Optionally, the results of any call dominators(v;B) are cached, for example, stored on cache memory 120 of FIG. 1. Alternatively or additionally, the set B'⊆B of blockers that were actually used to block some paths on line 4 is cached. Optionally, the results for (v;B') pairs are cached. Optionally, these values are equal to pdom(v;B'). Optionally, Algorithm 2 is optimized, for example, so that re-computations in line 1 are reduced.

As used herein, the term "pdom(v,B)" means the partial domination set of all nodes u such that every path from the initial node to v that does not include any element of B contains u.

Optionally, the following statement is added after line 1 of Algorithm 2:

---
if the cache contains a result R for a call dominators(v;B') where B' ⊆ B then
    return R
end if
---

Alternatively or additionally, blockers are cached, for example, when Algorithm 2 discovers an interprocedural dominance graph path from some blocker b to a node v. Optionally, the cached data is used in subsequent computations of blockers for v. Advantageously, caching the blockers may speed up subsequent computations.

FIG. 3A is an example of a program used to explain the system and/or method described herein for computing an interprocedural dominance graph, in accordance with exemplary embodiments of the invention.

Figure 3B:
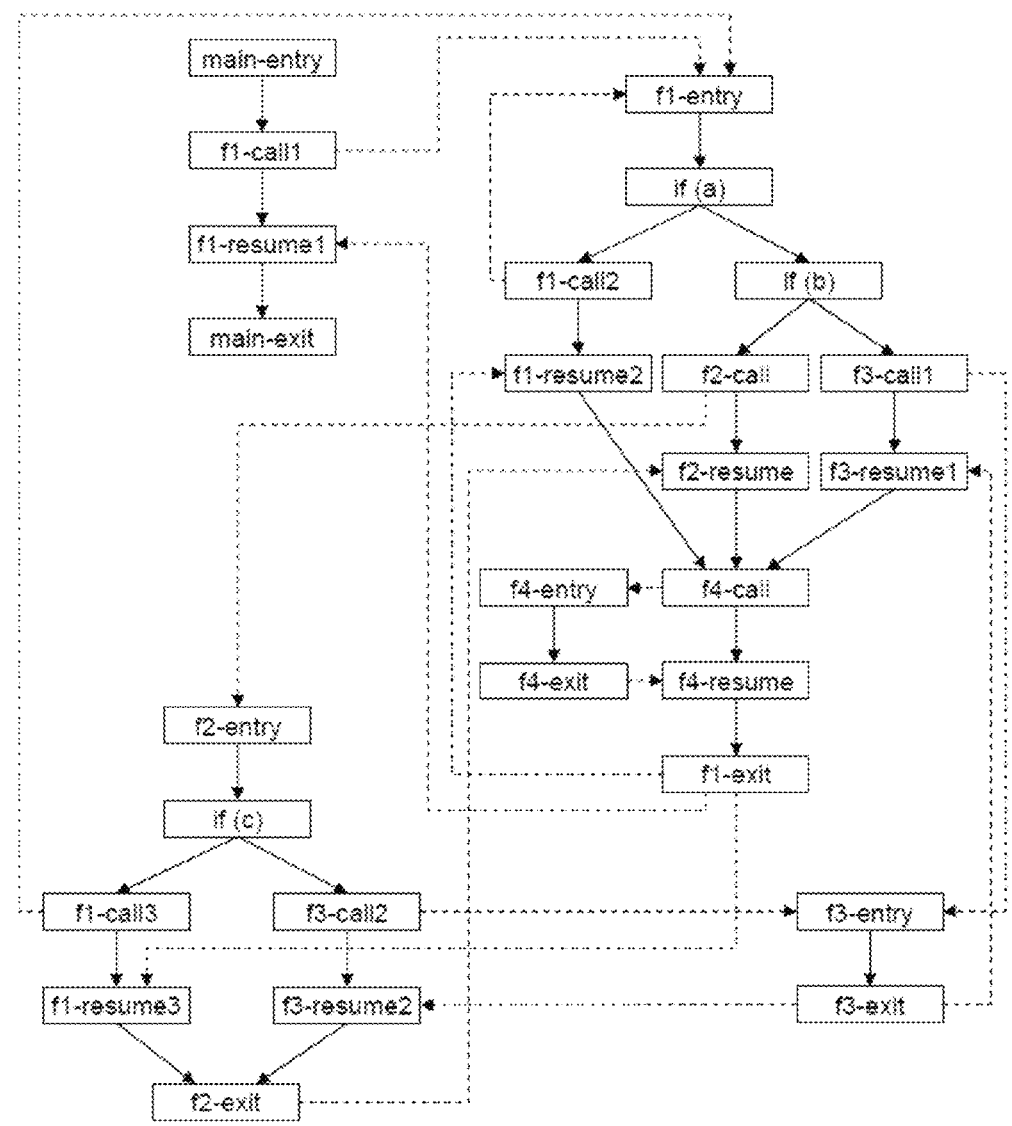
FIG. 3B is an interprocedural control-flow graph for the example program of FIG. 3A, in accordance with exemplary embodiments of the invention.

FIG. 3B is the interprocedural control-flow graph of the example program of FIG. 3A, in accordance with exemplary embodiments of the invention. The solid arrows represent intraprocedural data flow. The dashed arrows represent call and/or return edges.

Figure 3C:
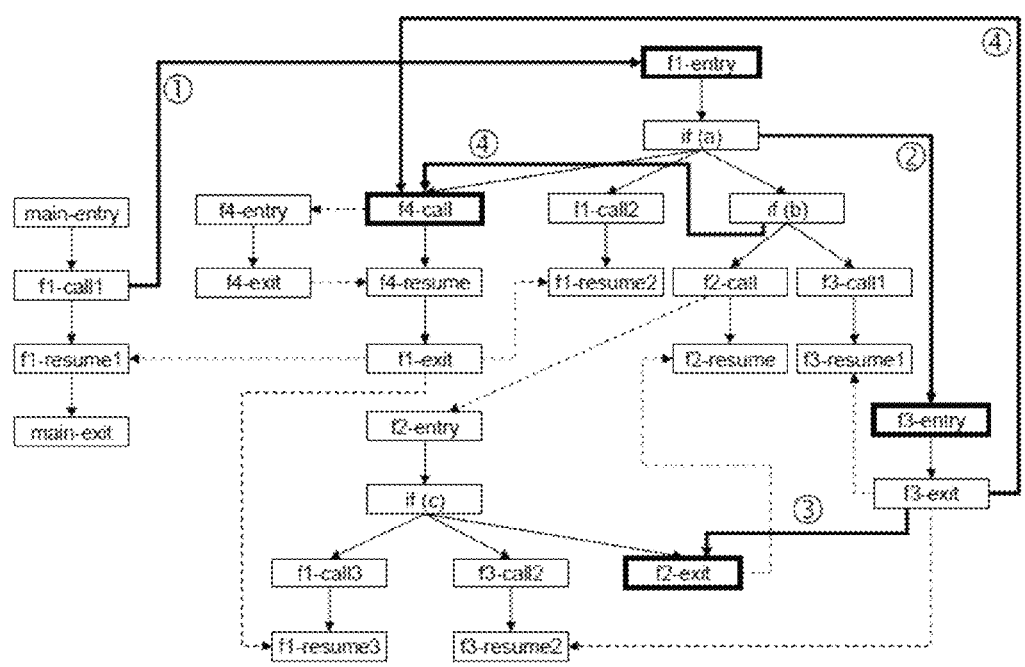
FIG. 3C is an interprocedural dominance graph computed for the example program of FIG. 3A, in accordance with exemplary embodiments of the invention.

FIG. 3C is the completed interprocedural dominance graph of the example program of FIG. 3A, in accordance with exemplary embodiments of the invention. Interprocedural dominance candidates are shown with thick borders. These consist of the entries of f1 and f3, each of which has multiple call sites, the exit of f2, which is in the dominance frontier of both resume nodes inside f2, and the call to f4 inside f1, which is in the dominance frontier of three resume nodes inside f1.

Interprocedural dominance graph edges that are part of the intraprocedural dominator trees are shown in FIG. 3C using full thin arrows. These edges are added, for example, in step 1 of Algorithm 1 (as described above) and/or in box 202 of FIG. 2.

Call and return edges are shown as dashed lines. These edges are added, for example, in steps 2 and/or 3 of Algorithm 1 and/or in box 204 of FIG. 2.

The derived edges added are shown as thick full arrows. The derive edges are added, for example, in step 4 of Algorithm 1 and/or in box 216 of FIG. 2. Optionally, the derived edges are numbered according to the order in which they are added to the interprocedural dominance graph. Edge number 1 was added during the processing of interprocedural dominance candidate node f1-entry. Edge number 2 was added while processing interprocedural dominance candidate node f3-entry. Edge number 3 was added while processing interprocedural dominance candidate node f2-exit. The two edges marked 4 were added while processing interprocedural dominance candidate node f4-call.

Figure 4A:
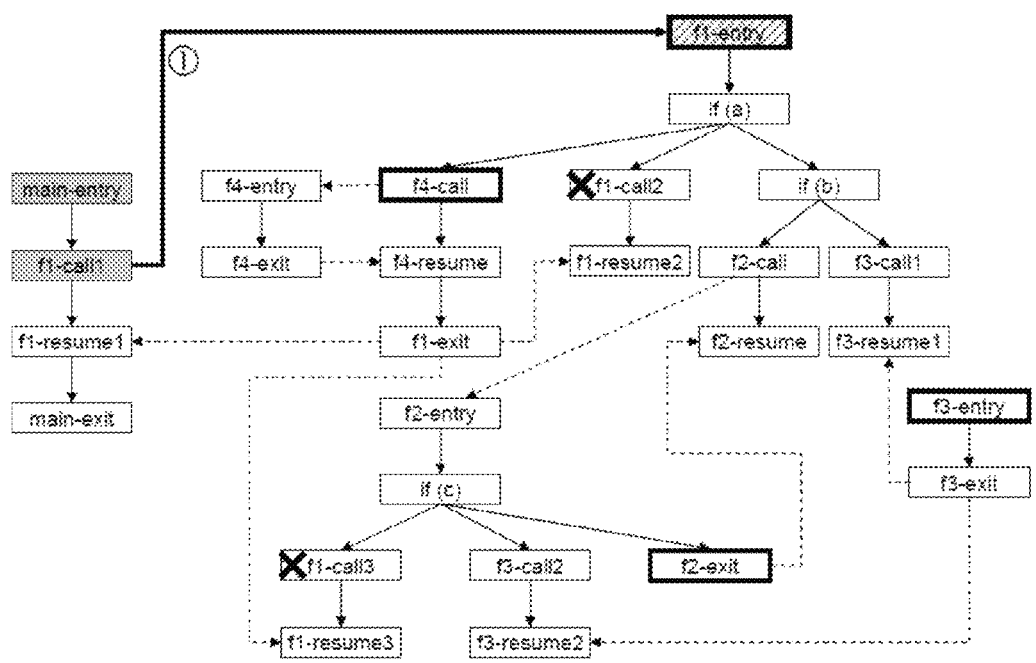
FIGS. 4A-4C are graphical representations of computing dominators of the example program of FIG. 3A.
Figure 4B:
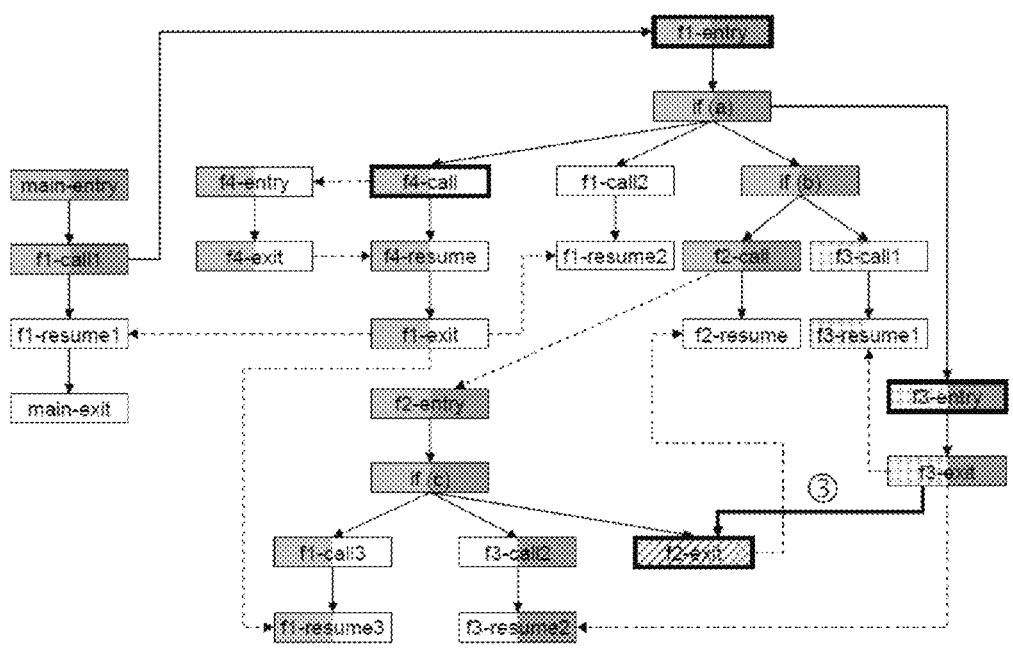
Figure 4C:
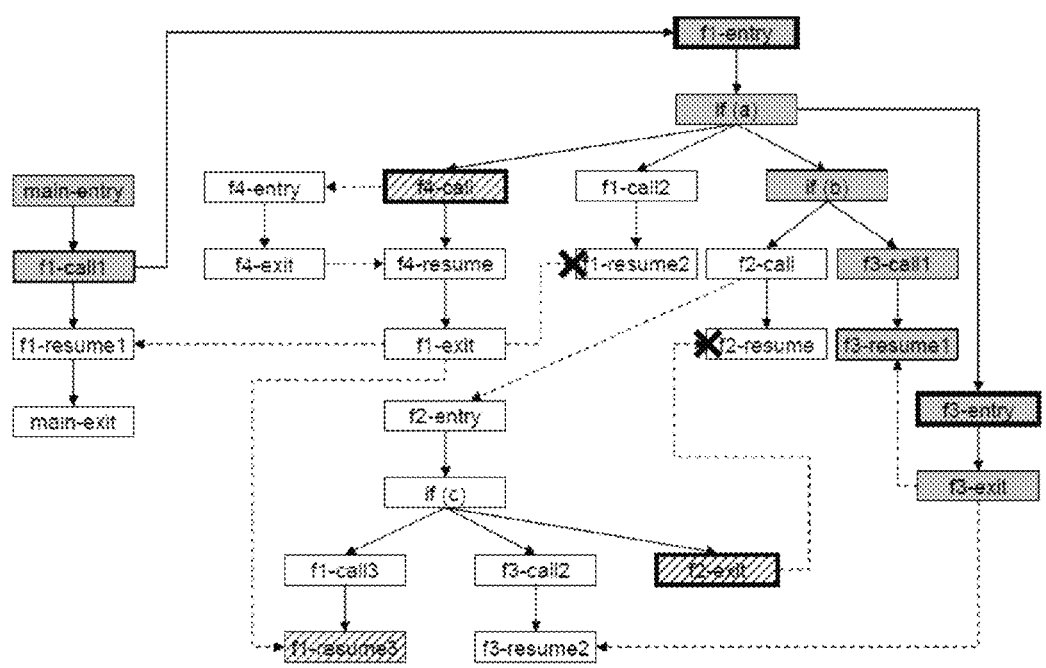

FIGS. 4A-C show three steps in the computation of the interprocedural dominance graph in the example program of FIG. 3A, in accordance with exemplary embodiments of the invention. The computations will be discussed with reference to Algorithm 1 and Algorithm 2. FIG. 4A is a graphical representation of computing the function dominators(f1-entry, ∅). FIG. 4B is a graphical representation of computing the function dominators(f2-exit, ∅). FIG. 4C is a graphical representation of computing the function dominators (f4-call, {f2-exit, f1-resume3}).

Nodes visited by the dominators function are shown shaded. The background of blockers is hatched. 'X' marks designate interprocedural control-flow graph predecessors that were skipped, for example, in line 4 of Algorithm 2, because they were reachable from blockers in the interprocedural dominance graph.

Attention is now drawn to FIG. 4A, which is a graphical representation of the computation of the interprocedural dominance graph during the analysis of node f1-entry. This node has three interprocedural control-flow graph predecessors, f1-call1, f1-call2, and f1-call3. The last two are reachable from f1-entry in the interprocedural dominance graph, and so the result contains f1-call1 and its single interprocedural dominance graph ancestor, namely, main-entry, which are the two elements of the set S, for example, as in step 4a of Algorithm 1. Because f1-call1 is reachable from main-entry in the interprocedural dominance graph, only the former is in idom(f1-entry), and edge number 1 is added to the interprocedural dominance graph.

Attention is now drawn to FIG. 4B, which is a graphical representation of the computation of the interprocedural dominance graph during the analysis of node f2-exit. This node has two interprocedural control-flow graph predecessors, f3-resume2 and f1-resume3. In an example, the first recursive call is dominators (f3-resume2; {f2-exit}). The nodes visited during this call are shown with their right halves shaded. This call follows interprocedural dominance graph edges backward to f3-call2, if (c), f2-entry, f2-call, if (b), if (a), and f1-entry. This is an interprocedural dominance candidate node for which idom has already been computed, but Algorithm 2 repeats the computation. In this example, the algorithm has been optimized. That is, the algorithm continues following interprocedural dominance graph edges instead of recomputing dominators in such cases, adding f1-call1 and main-entry to the result of the first recursive call. From f3-resume2, the algorithm also follows the interprocedural dominance graph edge to f3-exit, then to f3-entry and, following edge number 2, which was added during the handling of f3-entry (calculations not illustrated), to if (a), which has already been visited.

The second recursive call is dominators(f1-resume3; {f2-exit}). The nodes visited during this call are shown in FIG. 4B with their left halves shaded. This call follows interprocedural dominance graph edges to f1-call3, and continues in the same way as the previous call to if (c) until it reaches main-entry. At this point, the previously-computed interprocedural dominance graph edges for f1-entry are used.

From f1-resume3, the algorithm also follows the interprocedural dominance graph edge to f1-exit, then to f4-resume, and f4-call. This requires a recursive call dominators (f4-call; {f2-exit; f1-resume3}). FIG. 4C is a graphical representation of the computation of the interprocedural dominance graph during the recursive call. The interprocedural control-flow graph predecessors of f4-call are f1-resume2, f2-resume, and f3-resume1. The first is reachable in the interprocedural dominance graph from the blocker f4-call, and the second from f2-exit. Therefore the algorithm follows interprocedural dominance graph edges from f3-resume1 to f3-exit, f3-entry and if (a), from which it continues as before; from f3-resume1 it also follows to f3-call1 and if (b), continuing as before. All this data is added to the result of the second recursive call. The four new nodes added by this recursive call are shown in FIG. 4B with lighter shading on their left sides. The minimal nodes in the intersection of the two calls are if (c) and f3-exit. The interprocedural dominance graph already contains an edge from the former to f2-exit, but edge number 3 is added to the interprocedural dominance graph as a result of this call.

Figure 5C:
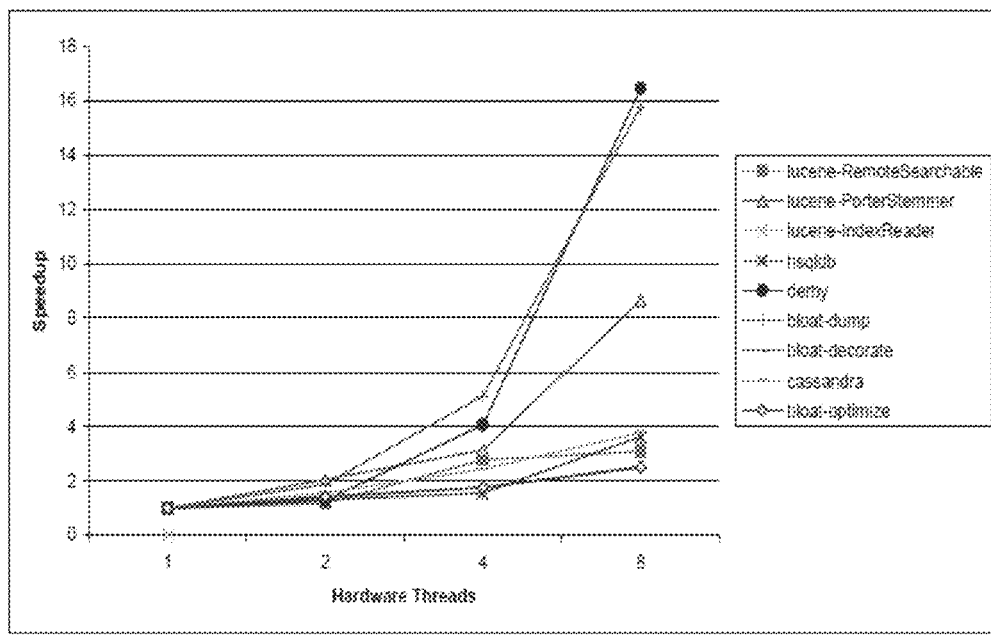
FIG. 5C is a graph of experimental results, useful for helping to understand exemplary embodiments of the invention.

Inventors tested an algorithm that was built in accordance with exemplary embodiments of the invention, for example, FIG. 2, Algorithm 1 and/or Algorithm 2. FIGS. 5A and 5B are tables of experimental results, and FIG. 5C is a chart of experimental results.

The implementation of the algorithm tested is different than Algorithm 1 and/or Algorithm 2. Instead of searching for all blocked paths on line 4 of Algorithm 2, the recursive calls were continued. Whenever such a call encounters a blocker, it returns an empty set, as a marker of failure. Such failures are ignored in the final result. Another modification keeps track of blocker sets rather than pairs.

The algorithm was tested on several Java projects. Some findings from the experiment include:
  The order in which calls are made to the dominators function, and the resulting behavior of the cache, may have a profound effect on overall performance.
  A sequential depth-first strategy, even with some heuristic ordering of nodes, may give the worst results.
  Running multiple threads with yield points may improve performance, even on a single CPU.
  Additional hardware threads may provide a significant boost in performance.

FIG. 5A is a table that summarizes the applications on which the algorithm was tested; several come from the same project. All are open-source projects. RemoteSearchable, PorterStemmer, and IndexReader are part of LUCENE™, a text search engine library; HSQLDB and DERBY™ are relational database engines; Casandra is a no-SQL distributed DBMS; and dump, decorate, and optimize are part of BLOAT™, a JAVA™ bytecode optimizer and class rewriter.

As the analysis includes libraries in jar files, a measure of the lines of codes could not be obtained; the more relevant statistic to the computation of dominators is in any case the number of basic blocks. In addition, FIG. 5A lists the total number of methods and the number of interprocedural dominance candidate nodes in each application. The last number is also the number of basic blocks that contain interprocedural dominance candidate nodes, since there can be at most one interprocedural dominance candidate node in a basic block. As can be seen from FIG. 5A, this number is between 2-89% of the total number of basic blocks, and is close to 30% for the two largest applications. This may be significant because the crucial factor in the performance of the algorithm may be the number of interprocedural dominance candidate nodes.

FIGS. 5A and 5B show the running times of the algorithm on the test projects, in various configurations. The first configuration, labeled "1 Thread," gives the time for a single-threaded run, with some heuristics for ordering nodes. In three cases, the algorithm did not finish after an hour; these are marked with dashes in this column. The other columns give the results for a version of the algorithm that creates one thread per interprocedural dominance candidate node, where each thread yields in the beginning of every dominators call, running with 1, 2, 4, or 8 hardware threads on an INTEL™ i7-2720QM 2.20 GHz CPU that has 4 cores and 8 hardware threads. FIG. 5A shows the results for single runs. FIG. 5B shows the smallest and largest results of four sets of runs for each multi-threaded configuration of the three largest projects. FIG. 5C shows the speedup of the (average) multi-threaded results in graph form.

Times shown are only for the computation of the interprocedural dominators algorithm, excluding the time required to compute the interprocedural control-flow graph and intraprocedural dominators and dominance frontiers. The interprocedural control-flow graph was built by WALA and included polymorphic call edges based on WALA's ZeroOneCFA pointer analysis. Polymorphic calls where handled as described above.

Of note in FIG. 5B, is the relatively large variability in the run times. This may be due to the strong interdependence between various threads, for example, because of the cache optimization (e.g., as described in box 214 of FIG. 2). When running with a single thread that explores the graph in a depth-first manner, there may not be enough opportunities for this optimization to take effect, and performance may be considerably worse than when running multiple threads on a single processor, for example, as can be seen by comparing the "1 Thread" and "1 CPU" columns of FIG. 5A. It appears that this effect is particularly strong for the larger programs. However, the variability was never so large for the multi-threaded version to approach the single-threaded performance for these cases. While the single-threaded version never terminated in under an hour for the three largest projects, the multi-threaded version running on a single CPU always finished within a few minutes at most.

This dependence on the order in which interprocedural dominance candidate nodes are processed may also affect the speedup results. In some cases, the speedup is larger than difference in the number of processors; this may be due to the fact that more processors enable more interprocedural dominance candidate nodes to be processed in parallel, which may enrich the cache and may make the optimization more effective.

The methods as described above are used in the fabrication of integrated circuit chips.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant interprocedural dominator graph calculation methods will be developed and the scope of the term interprocedural dominator graph calculation methods is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for compiler optimization using a graph updated by analyzing dominance relationships between a plurality of functions of the software program, the method comprising:

receiving, at a computer including at least one processor and memory, a source code of a software program, the source code having a plurality of functions;

identifying a plurality of intraprocedural dominator graphs each for another of the plurality of functions of the source code;

combining, by the at least one processor, the plurality of intraprocedural dominator graphs to create a combined interprocedural dominance graph with edges that logically connect between nodes of the plurality of functions of the source code;

identifying, by the at least one processor, a plurality of interprocedural dominance relations between nodes in different functions of the plurality of functions of the source code using the combined interprocedural dominance graph;

computing a static single assignment (SSA) form based on the plurality of interprocedural dominance relations;

performing an analysis of the received software program according to the plurality of interprocedural dominance relations;

updating the combined interprocedural dominance graph by:

making localized changes to one or more of the plurality of functions of the source code;

identifying a group of functions from the plurality of functions, wherein members of the group are affected by the localized changes;

re-computing an interprocedural dominator set for the group; and re-connecting only nodes of the group; and using the updated combined interprocedural dominance graph for compiler optimization.

2. The computerized method of claim 1, further comprising:

identifying one or more interprocedural dominance candidates in the combined intraprocedural dominator graph;

computing an interprocedural dominator set for each of the interprocedural dominance candidates; and wherein combining comprises computing the combined interprocedural dominance graph by logically adding interprocedural edges between the one or more interprocedural dominance candidates and one or more dominators from the interprocedural dominator set.

3. The computerized method of claim 1, wherein combining comprises computing an interprocedural dominator set for each of one or more interprocedural dominance candidates of a plurality of interprocedural dominance candidates in parallel.

4. The computerized method of claim 1, wherein the combined interprocedural dominance graph represents correct domination relationships during intermediate periods of the combining the plurality of intraprocedural dominator graphs to create the combined interprocedural dominance graph.

5. The computerized method of claim 1, further comprising caching data of a computed interprocedural dominator set so that the cached data is available for subsequent dominator calculations.

6. The computerized method of claim 1, wherein combining comprises creating the combined interprocedural dominance graph by adding an edge connecting a call node of a function with a single call site, to an entry node of the function.

7. The computerized method of claim 1, wherein combining comprises creating the combined interprocedural dominance graph by adding an edge connecting each function exit node to every resume node the function may return to.

8. The computerized method of claim 1, further comprising:

identifying an interprocedural control flow graph of the plurality of functions of the source code, and representing each polymorphic call of the interprocedural control flow graph as a series of tests on a dynamic type of a target.

9. The computerized method of claim 1, further comprising removing extra edges from the combined interprocedural dominance graph, wherein the extra edges summarize interprocedural edges already existing in the combined interprocedural dominance graph.

10. The computerized method of claim 1, wherein combining comprises incrementally building the combined interprocedural dominance graph by incrementally adding edges to an existing interprocedural dominance graph.

11. The computerized method of claim 1, wherein one or more function calls of the plurality of functions of the source code are polymorphic.

12. The computerized method of claim 1, wherein the intraprocedural dominator graphs are intraprocedural dominator trees.

13. A system for computing a combined interprocedural dominance graph from a plurality of associated functions, the system comprising:

at least one first processor;

a network interface; and a first memory in electrical communication with the at least one first processor and the network interface, the first memory having stored thereon instructions for implementation by the at least one first processor, comprising:

instructions to receive a source code of a software program, the source code having a plurality of functions;

instructions to identify a plurality of intraprocedural dominator graphs each for another of the plurality of functions of the source code;

instructions to combine the plurality of intraprocedural dominator graphs to create a combined interprocedural dominance graph logically connecting between nodes of the plurality of functions of the source code;

instructions to identify a plurality of interprocedural dominance relations between nodes in different functions of the plurality of functions of the source code using the combined interprocedural dominance graph; and instructions to compute a static single assignment (SSA) form based on the plurality of interprocedural dominance relations;

instructions to perform an analysis of the received software program according to the plurality of interprocedural dominance relations;

instructions to update the combined interprocedural dominance graph by making localized changes to one or more of the plurality of functions of the source code, identifying a group of functions from the plurality of functions, wherein members of the group are affected by the localized changes re-computing an interprocedural dominator set for the group, and re-connecting only nodes of the group; and instructions to use the updated combined interprocedural dominance graph for compiler optimization.

14. The system of claim 13, further comprising a plurality of processors in electrical communication with the at least one first processor, and the first memory comprises instructions to compute an interprocedural dominator set for each of one or more interprocedural dominance candidates in parallel among the plurality of processors.

15. The system of claim 13, further comprising one or more input units adapted for allowing a user to input the changes to one or more of the plurality of functions of the source code, and the first memory comprising instructions to re-compute an interprocedural dominator set only for a plurality of affected interprocedural dominance candidates of the one or more functions that were changed.

16. The system of claim 13, further comprising a cache memory in electrical communication with at least one of the first processor and the first memory, the first memory further comprising instructions to store data of a computed interprocedural dominator set on the cache memory so that the cached data is available for subsequent dominator calculations.

17. A computer program product for computing a combined interprocedural dominance graph from a plurality of associated functions, the computer program product comprising:

one or more non-transitory computer-readable storage mediums, and program instructions stored on at least one of the one or more non-transitory computer-readable storage mediums, the program instructions comprising:

program instructions to receive source code of a software program, the source code having a plurality of source code functions;

program instructions to identify a plurality of intraprocedural dominator graphs each for another of the plurality of source code functions;

program instructions to combine the plurality of intraprocedural dominator graphs to create a combined interprocedural dominance graph logically connecting between nodes of the plurality of source code functions;

program instructions to identify a plurality of interprocedural dominance relations between nodes in different functions of the plurality of source code functions using the combined interprocedural dominance graph;

program instructions to compute a static single assignment (SSA) form based on the plurality of interprocedural dominance relations;

program instructions to perform an analysis of the received software program according to the plurality of interprocedural dominance relations;

program instructions to update the combined interprocedural dominance graph by making localized changes to one or more of the plurality of functions of the source code, identifying a group of functions from the plurality of functions, wherein members of the group are affected by the localized changes, re-computing an interprocedural dominator set for the group, and re-connecting only nodes of the group;

program instructions to use the updated combined interprocedural dominance graph for compiler optimization.

* * * * *